UNITED STATES PATENT OFFICE.

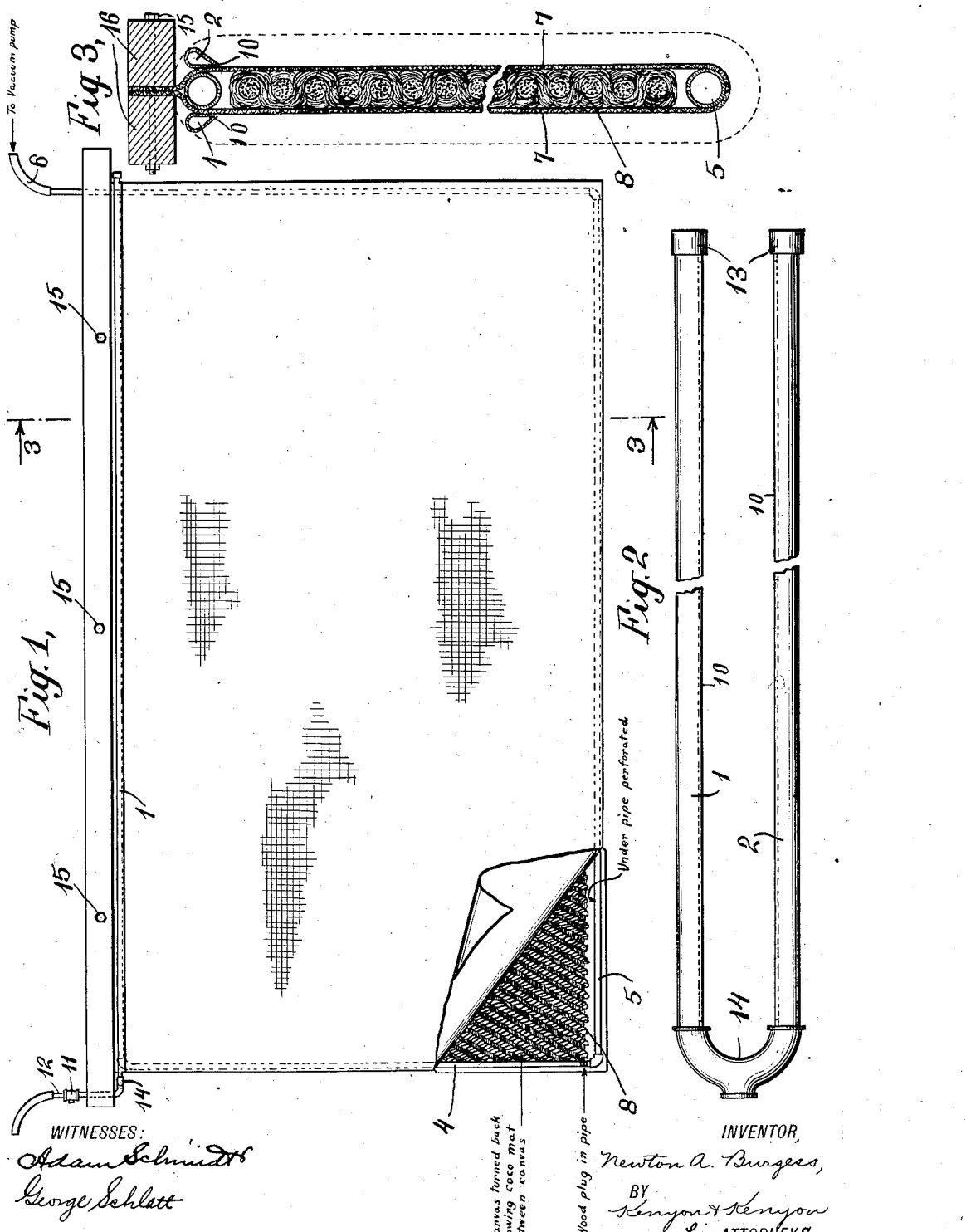

NEWTON A. BURGESS, OF NEW YORK, N. Y., ASSIGNOR TO BUTTERS PATENT VACUUM FILTER COMPANY, INC., A CORPORATION OF NEVADA.

FILTER-LEAF.

1,114,224.   Specification of Letters Patent.   Patented Oct. 20, 1914.

Application filed August 30, 1913.   Serial No. 787,419.

*To all whom it may concern:*

Be it known that I, NEWTON A. BURGESS, a citizen of the United States, and a resident of the city, county, and State of New York, have invented certain new and useful Improvements in Filter-Leaves, of which the following is a specification.

The object of my invention is to effectively and rapidly dislodge slime cakes which are formed on the filter surfaces of filter leaves during the process of filtering compounds, resulting from the well-known cyanid process of treating ores.

My invention consists in an improved means for applying water under pressure externally of the filter leaf in such a way that the time for the cake dislodgment is materially shortened and the surface of the leaf is thoroughly cleansed.

Specifically, my invention consists in improved means for applying water under pressure near the top of the leaf and underneath the surface of the cake, between the cake and the filter medium.

By my invention the cake may be completely dislodged without any internal pressure whatever, thus saving the filter medium the wear and tear incident to internal pressure, but it may be used with internal pressure also, if desired.

The subject-matter of this application is an improvement on the apparatus described and claimed in an application of George W. Shepherd, Serial No. 764,842, filed May 1, 1913, and is adapted to be used with the process described and claimed in said application. The process set forth in said application is that of introducing a fluid under pressure beneath the surface of the cakes formed on filter leaves whereby they are caused to be readily dislodged from the filter media. The apparatus employed in said application consists of two pipes, one along each side of the leaf, with an opening for directing the water or other fluid beneath the surface of the cake formed on the media. These pipes are connected with a suitable source of fluid for performing their function.

The specific object of my invention is the provision of a pipe for introducing fluid under pressure beneath the surface of the cake at the line of contact between the cake and the medium, and also the provision of a pipe which has an opening along the lower side thereof, which opening is so protected that foreign matter will not get into the opening and thereby obstruct the flow of fluid for dislodging the cake. Many advantages result from this construction which will be apparent upon reading the following detailed description taken in connection with the accompanying drawings, in which—

Figure 1 is a side elevation of a filter leaf embodying my invention; Fig. 2 is a bottom view of the pipes used for supplying fluid to dislodge the cake; and Fig. 3 is an enlarged section on line 3—3 of Fig. 1, with a cake thereon shown in dotted lines.

In Fig. 1, 4 represents the frame, which may be of any construction, but it preferably consists of tubing, the bottom member 5 of which is perforated or slotted, the perforations or slot opening into the interior of the leaf. This member is connected in this instance through the right-hand end of the frame-member with a vacuum pump, not shown, through any suitable connection, as 6. 7—7 are filter media, one on each side of the frame. These are held apart during the filtering process by any suitable spacing means such as cocoa matting 8. The filter media may be stitched together, if desired, for the purpose of holding the spacing means in place. This stitching is also useful in preventing ballooning if internal pressure is placed on the leaf. The upper part of the filter media 7 is securely clamped between the headers 16 by means of bolts 15.

1, 2 represent small pipes running along the upper portion of the leaf. Each of these pipes has openings or a slot 10 along the length thereof extending substantially the whole length of the leaf. These slots or rows of openings are preferably placed near the lower side of the pipes and slightly inward toward the filter surface so that the water will be applied in the direction thereof. The outer end of the pipes is closed by an ordinary cap 13. The pipes are joined by suitable fixture 14 which is arranged to be connected to the supply pipe 12. It is desirable that the openings in the pipes 1, 2 be so arranged that they will lie beneath the surface of the cake which is formed during the filtering operation so that when water, or other fluid, is admitted to the pipes it will be initially applied beneath the surface of the cake and between the cake and the filter media. It has been found desirable in some cases to protect these slots or openings so as to prevent the deposit, by sedimentation or otherwise, of particles therein. In the present invention this has been accomplished by the peculiar shape of the pipes as best shown in Fig. 3. By an inspection of this figure it will be seen that the pipe has a heart-shaped cross-section with the side adjacent the filter medium of substantially the contour of the medium. This side is shorter than the opposite side which projects downward beyond the end of the side adjacent the medium thereby forming an opening 10 near the lower side of the pipe. The side of the pipe away from the medium may, or may not, contact with the medium. In any case, the projection of the outer side of the pipe below the end of the inner side thereof forms a shield for the opening 10, and thereby prevents the accumulation of sediment or foreign matter of any nature in the opening. By means of the shape of the pipe the water, when admitted into the pipes 1, 2, will be directed along the surface of the medium and will thereby produce the greatest effect in removing the cake from the medium.

Having described my invention, what I claim as new and desire to secure by Letters Patent, is:—

1. A filter leaf comprising a frame, a filter medium mounted thereon and a pipe having a substantially straight portion adjacent said medium and open at the bottom said pipe being arranged so that the opening therein is beneath the surface of a cake formed on said medium.

2. A filter leaf comprising a frame, a filter medium mounted thereon and a pipe mounted thereon having one straight side adjacent the filter medium and another side extending below the first and out of contact therewith whereby an opening is formed between the lower portions of said sides.

3. A filter leaf comprising a frame, a filter medium mounted thereon and a pipe also mounted thereon having a straight side adjacent the medium and said pipe increasing in cross-section from the bottom, and having an opening in the bottom thereof with an overhanging portion whereby foreign matter is prevented from entering said opening.

4. A filter leaf comprising a frame, a filter medium mounted thereon and a pipe mounted thereon having a straight side adjacent the filter medium, and a portion extending below the lower portion of said side but out of contact therewith whereby an opening between said portions is formed and foreign matter is prevented from entering said pipe.

In testimony whereof, I have signed my name to this specification, in the presence of two subscribing witnesses.

NEWTON A. BURGESS.

Witnesses:
　GEORGE SCHLATT,
　EDWIN SEGER.